United States Patent [19]

Bremer et al.

[11] 4,007,890
[45] Feb. 15, 1977

[54] AIRCRAFT TOWING BRAKING SYSTEM
[75] Inventors: Allen Robert Bremer, Seattle; Garrett Howard De Vlieg, Bellevue, both of Wash.
[73] Assignee: The Boeing Company, Seattle, Wash.
[22] Filed: Sept. 30, 1975
[21] Appl. No.: 618,297
[52] U.S. Cl. .............................. 244/50; 180/14 C; 188/3 R; 244/111; 303/7
[51] Int. Cl.² .......................................... B60T 13/68
[58] Field of Search ................ 180/14 C; 188/3 R; 244/50, 111; 303/3, 7, 15, 20, 21 F, 113, 117, 118

[56] References Cited
UNITED STATES PATENTS

| | | | |
|---|---|---|---|
| 3,350,142 | 10/1967 | Schuman | 188/3 R X |
| 3,507,541 | 4/1970 | Ayers, Jr. | 303/3 X |
| 3,790,807 | 2/1974 | Rossigno | 303/7 |
| 3,836,205 | 9/1974 | Schwerin | 188/3 R X |
| 3,920,282 | 11/1975 | De Vlieg | 244/111 X |

*Primary Examiner*—Stephen G. Kunin
*Attorney, Agent, or Firm*—Conrad O. Gardner

[57] ABSTRACT

System for providing automatic synchronization of towing tug and aircraft braking systems during aircraft towing operations. A tow brake controller utilizing an aircraft brake pressure control circuit provides aircraft automatic brake pressure control signals in the aircraft automatic braking system in response to tractor braking signals. The brake pressure control circuit provides an increase and then a decrease in aircraft automatic braking system pressure in response to tow vehicle operator applied brake pressure.

1 Claim, 3 Drawing Figures

AIRCRAFT TOWING BRAKING SYSTEM

This application is an improvement over application Ser. No. 394,890, filed Sept. 6, 1973 (U.S. Pat. No. 3,917,356 issued Nov. 4, 1975); also assigned to the same assignee as this application.

This invention relates to tow braking systems for aircraft and more particularly to tow braking systems providing synchronized towing tug and aircraft braking during aircraft towing operations.

Towing of large aircraft (large in size and weight compared to the towing vehicle), particularly in colder climates can result in equipment damage during towing operations on icy surfaces. Such damage usually results when the towing vehicle and/or aircraft begin to skid during sharp turns or braking such that the towing bar breaks or the aircraft collides into a hangar or another aircraft. During such times the braking of the towing vehicle alone is insufficient to stop the aircraft before damage is sustained.

As a consequence of the preceding, it is an object of the present invention to provide means for automatically synchronizing towing tug and aircraft braking systems thereby reducing or precluding the occurrence of the aforementioned types of incidents.

It is a further object of this invention to provide slaving of an aircraft braking system to a tow vehicle braking system so that increasing aircraft braking is provided at a predetermined rate to a given level in response to a predetermined level of applied tow vehicle braking pressure.

It is another object of the present invention to provide brake pressure control circuit means for generating shutoff valve and pressure control valve control signals in an aircraft automatic braking system in response to tractor braking signals and aircraft disposed arming switch actuation.

It is yet another object of this invention to provide means in parallel with an automatic braking system for providing a further brake pressure control signal in said automatic braking system in response to command signals from a tow brake control system.

It is still another object of this invention to provide increased towing vehicle braking control over aircraft towing to and from runways when feasible thereby permitting increased use of towing vehicles and conservation of fuel where such towing vehicles might not otherwise be utilized.

Above mentioned and other objects and features of this invention will become more apparent by reference to the following drawings in which.

Figure 1:
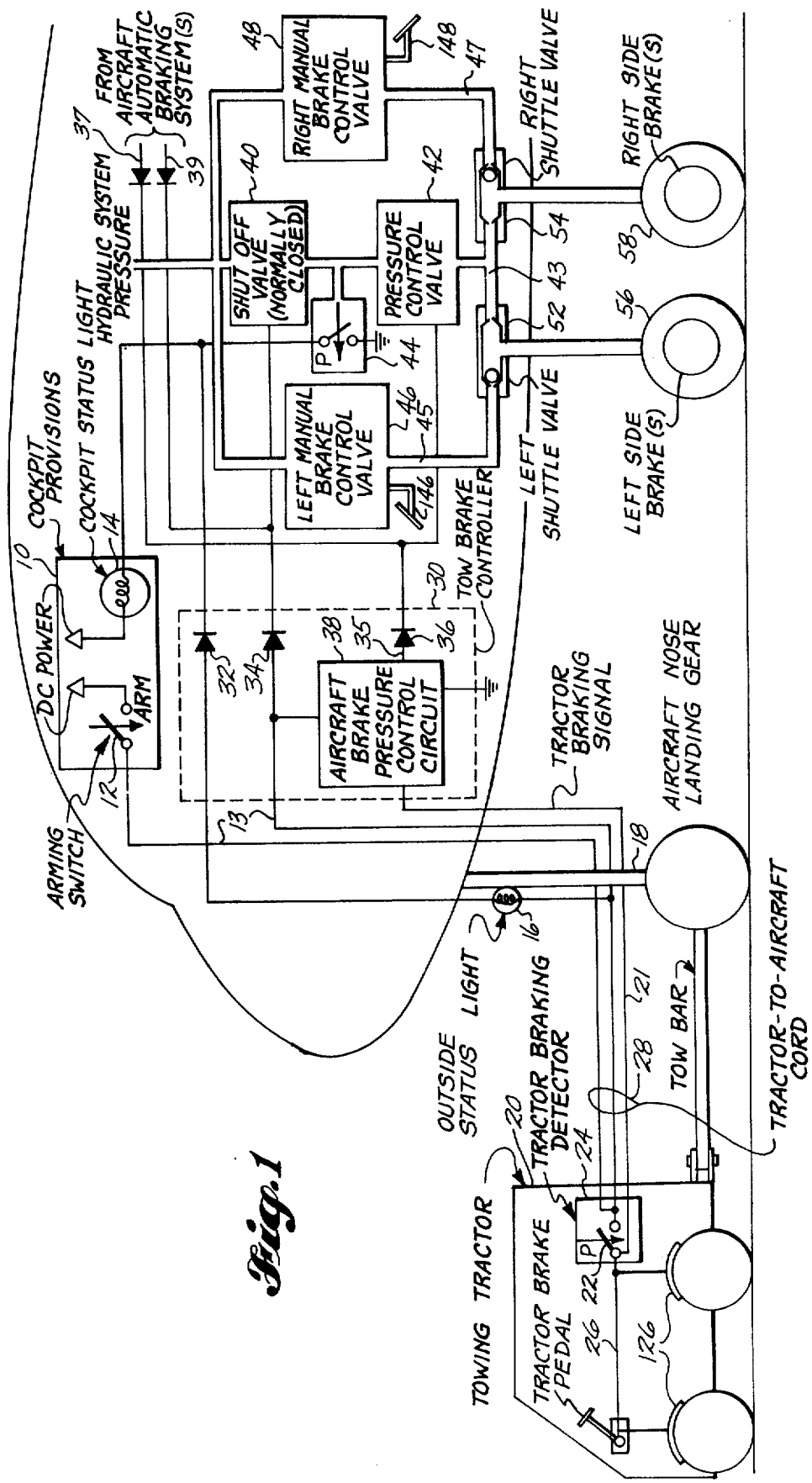
FIG. 1 is a schematic illustration of a towing vehicle-aircraft braking system in accordance with a preferred embodiment of the invention.

Turning now to FIG. 1, a preferred embodiment of the towing braking system of the present invention is shown coupled to an aircraft having an automatic braking system such as shown in aforementioned copending U.S. patent application Ser. No. 394,890 which application is incorporated herein by reference and to which reference may be made for further detailed understanding of said automatic braking system.

The tractor braking system of tractor 20 is responsive to the force which the tractor operator applies to his brake pedal 22 and provides tractor braking pressure in the line at 26 to the tractor brakes 126 associated with the respective tractor wheels. In the aircraft braking system, left and right metered pressures in the lines at 45 and 47 respectively are applied to left and right side brakes 56 and 58 through left and right shuttle valves 52 and 54 respectively in response to the pilot applied pressures through left and right cockpit brake pedals 146 and 148 controlling respectively left and right manual control valves 46 and 48. In accordance with the braking system shown in FIG. 1 of aforementioned copending patent application, and as shown in FIG. 1 herein, automatic braking pressure in the line at 43 may in the alternative provide the braking of left and right side brakes 56 and 58 of the aircraft through shuttle valves 52 and 54 respectively when shutoff valve 40 has been opened by electrical signal on the line at 37 (corresponding to signal 65 of FIG. 1 of said copending application) and pressure control valve 42 (corresponding to valve 37 of FIG. 1 in the aforementioned application) is modulating aircraft automatic braking pressure in the line at 43 in response to the amplitude of signal on the line at 39 (corresponding to the signal at 74 in FIG. 1 of said aforementioned application). It should be noted from the description in the aforementioned patent application and further noted here that in the operation of the automatic braking system and more particularly in the operation of left (or right) shuttle valve 52 (or 54), the greater of aircraft automatic braking pressure in the line at 43 OR aircraft left (or right) metered pressure in the line at 45 (or 47) passes through the respective shuttle valve to apply left (or right) side brake(s) while the lesser of the two pressures (metered or automatic) is blocked from passing through the shuttle valve(s).

Returning now to the system of FIG. 1, it will be observed that when arming switch 12 disposed in the cockpit of the aircraft is actuated by closing, D.C. arming power on the line at 13 is transmitted (through connector cable 28 coupled between tractor 20 and the aircraft) to tractor braking detector 24 and further coupled downstream to outside status light 16 (mounted on the aircraft nose landing gear indicating to the tow vehicle operator that the system is armed from the cockpit) and to tow brake controller 30. D.C. power present on lead 13 as hereinbefore described is then coupled through solenoid valve isolation diode 34 (in tow brake control 30) to shutoff valve 40 thereby causing valve 40 to open and permit hydraulic system pressure to be transmitted to pressure control valve 42 and shutoff valve output pressure switch 44, causing pressure switch 44 to close thereby causing a ground potential to be applied to outside status light 16 through outside status light isolation diode 32 (of tow brake control unit 30), and said ground potential to be also applied to cockpit disposed status light 14, causing both lights 16 and 14 to illuminate. As a consequence, when either or both lights are energized with D.C. power, and thus cause to be in an illuminated condition, an aircraft towing braking system ARMED status is indicated which more specifically is indicative of the fact that D.C. power is available to the system AND arming switch 12 has been actuated by closure thereof AND tractor to aircraft connector cable 28 has been properly connected at both ends AND the towing vehicle (tractor) 20 braking detector 24 is connected AND tow brake controller 30 is connected AND shutoff valve 40 is connected and in an open condition, AND hydraulic system pressure is available to the aircraft braking system AND shutoff valve output pressure switch 44 is connected and operating properly.

Turning now to a functional description of the present system during the towing mode of operation, it will be observed that when the towing vehicle or tractor operator applies sufficient brake pedal pressure to provide tractor braking in the line at pressure 26 exceeding a predetermined level, tractor brake pressure sensing switch 22 of tractor braking detector 24 is closed thereby coupling tractor braking signal on the line at 21 comprising D.C. power to aircraft brake pressure control circuit 38 of tow brake controller 30. In response to the aforementioned tractor braking signal on the line at 21, aircraft brake pressure control circuit 38 generates a pressure control valve command signal on the line at 35 having a wave-shape (shown in FIG. 3) hereinafter described in more detail. Suffice it to say at this time that pressure control valve command signal on the line at 35 is then transmitted through pressure control valve isolation diode 36 to pressure control valve 42. Aircraft automatic braking pressure in the line at 43 is then modulated in accordance with the magnitude of pressure control valve command signal on the line at 35 applied to aforementioned pressure control valve 42. If the pilot has not applied left or right metered pressures in the lines at 45 or 47 by means of cockpit brake pedals 146 or 148, then aircraft automatic braking in the line at pressure 43 will be transmitted through left and right shuttle valves 52 and 54 to left and right side brake(s) 56 and 58 causing all of said brakes to apply equal braking representative of the pressure control valve command signal on the line at 35. In this connection, various left and right side braking arrangements downstream as shown in FIGS. 1 to 4 of the aforementioned copending application may be controlled by control valve command signal on the line at 35 herein as were controlled by signal 74 therein.

In the system embodiment as shown in FIG. 1, brake pressure control circuit 38 operates in a manner such that when tractor braking signal on the line at 21 is provided, indicating an ON condition (representative of tractor operator brake pressure application above a predetermined threshold level), brake pressure control circuit 38 will cause aircraft left and right side brakes(s) 56 and 58 to be applied with equal force, and when tractor brake pressure is released indicating an OFF condition of signal on the line at 21 (e.g. lower level D.C. or zero level D.C. signal compared to the ON signal), then brake pressure control circuit 38 will cause release of aircraft left and right side brake(s) 56 and 58 thereby synchronizing tractor and aircraft braking systems.

Figure 2:
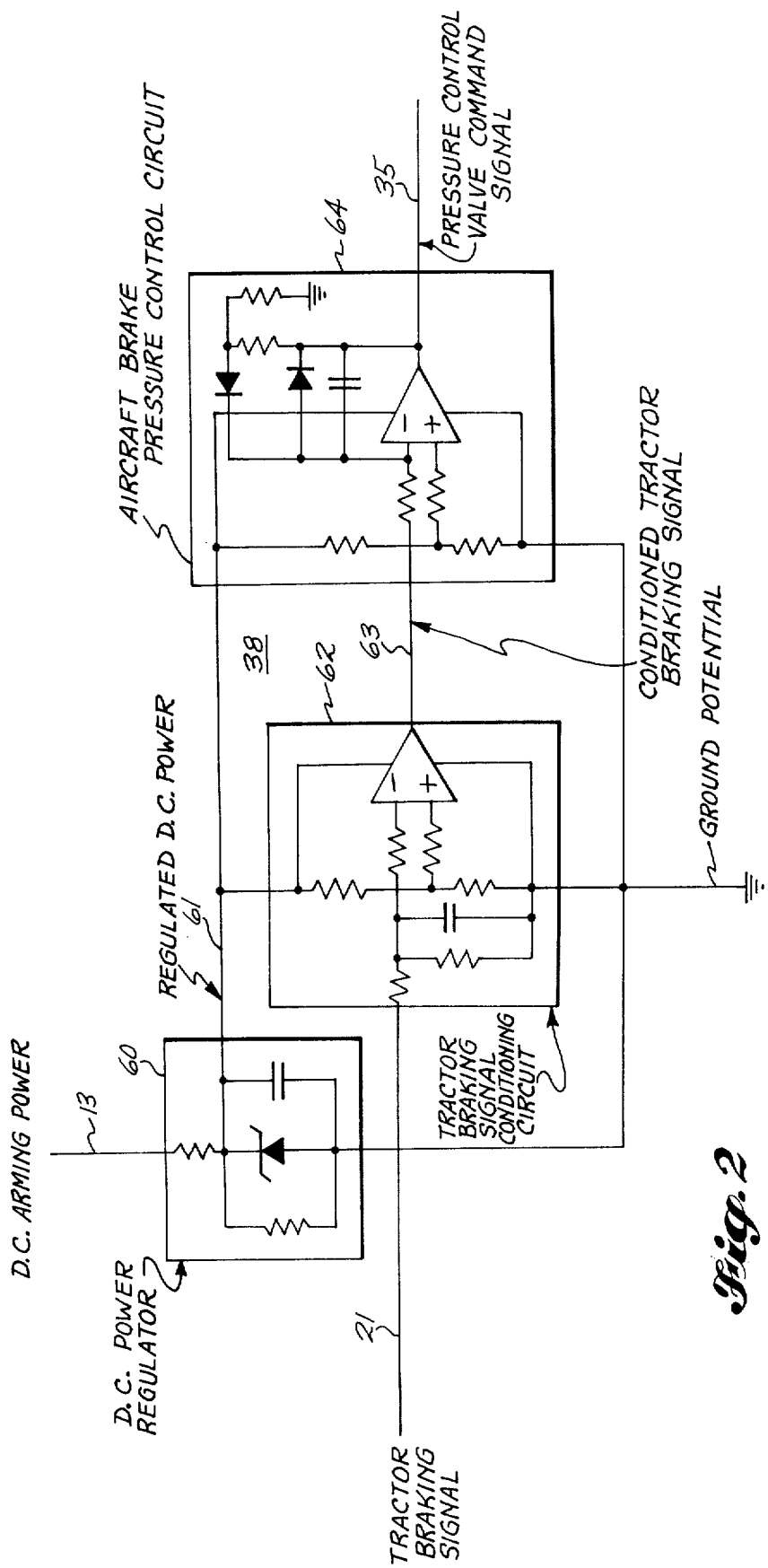
FIG. 2 is a schematic diagram of the aircraft brake pressure control circuit of the system of FIG. 1; and, FIG. 3 is a time history diagram of tractor braking pressure and resultant aircraft automatic braking pressure occurring in the system of FIG. 1 believed helpful and further explanatory of said system.

Turning now to FIG. 2 wherein a brake pressure control circuit 38 suitable for use in the brake controller 30 portion of the system of FIG. 1 is shown, D.C. arming power 13 is shown coupled to D.C. power regulator 60 of known type to provide at the output thereof regulated D.C. power 61 which power 61 is coupled to tractor braking signal conditioning circuit 62 and aircraft brake pressure control circuit 64 to provide D.C. power for operating these circuits. Tractor braking signal on the line at 21 is coupled through tractor braking signal conditioning circuit 62 which scales down and inverts the sense of signal on the line at 21 (e.g. from 28 volts ±10 volts and 0 volts) to provide a finer control signal 63 (e.g. of 0.5 volts and 10 volts ±½ volt) thereby providing a conditioned tractor braking signal on the line at 63 (ON or OFF signal, e.g. predetermined level D.C. signal and 0 level signals respectively) at the output of aforementioned signal conditioning circuit 62 in response to said tractor braking signal on the line at 21. Conditioned ON or OFF signal on the line at 63 is then coupled to aircraft brake pressure control circuit 64 which circuit 64 generates pressure control valve command signal on the line at 35 for controlling pressure control valve 42 and thereby aircraft automatic braking pressure in the line at 43. Aircraft brake pressure control circuit 64 operates in a manner similar to circuit 22 of FIG. 1 of the aforementioned patent application viz. providing ramping and limiting functions so that pressure increase and pressure decrease are controlled at a predetermined rate and pressure magnitude is limited to not exceed or fall below certain maximum and minimum preset limits respectively, thereby preventing jerk or jolt of the aircraft during braking.

Figure 3:
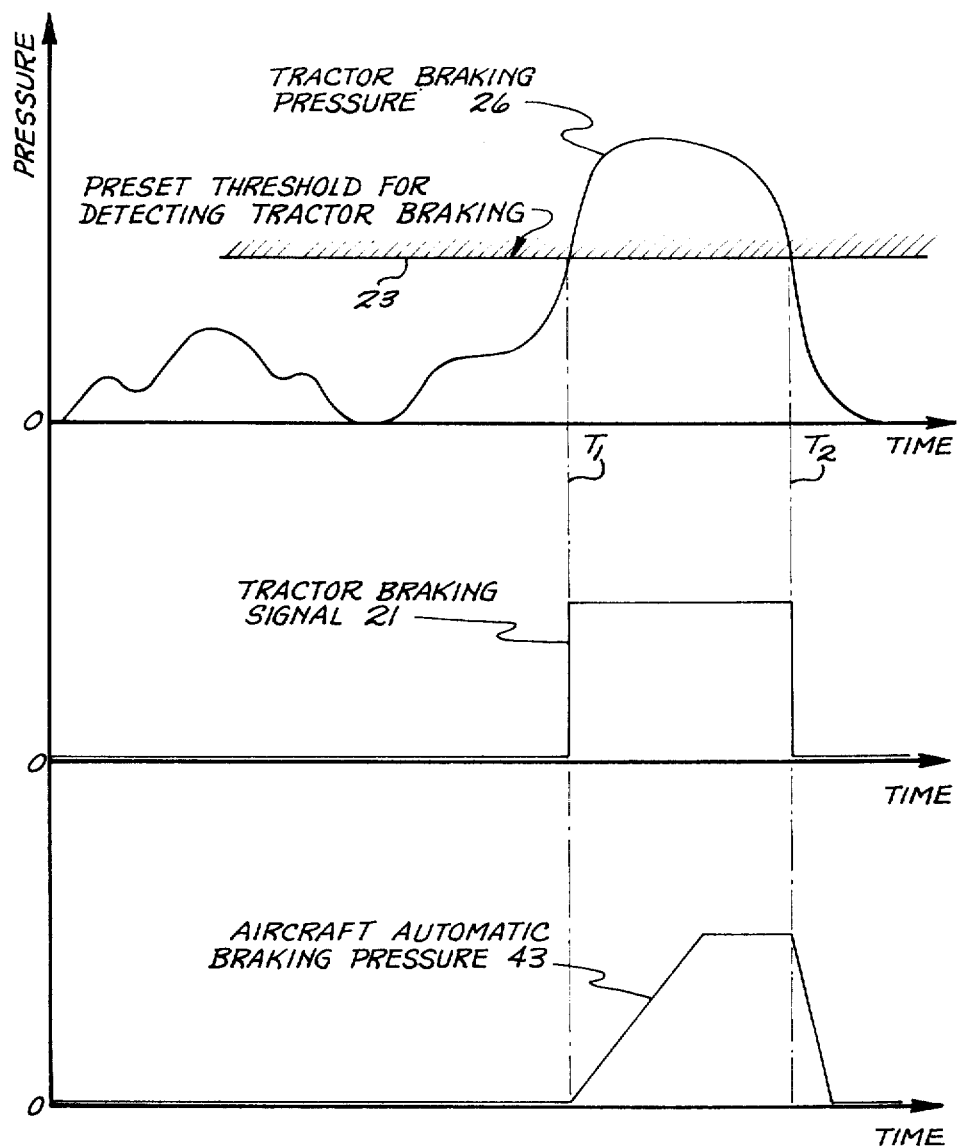

Now, turning to FIG. 3 for an explanatory time history of applied tractor braking pressure in the line at 26, tractor braking signal on the line at 21, and automatic braking pressure in the line at 43 in the system of FIG. 1, it can be seen that up to time $T_1$, applied tractor braking pressure in the line at 26 remains below the preset threshold 23 (established at tractor brake pressure sensing switch 22 of tractor braking detector 24) for detecting tractor braking so that no tractor braking signal is provided nor consequent aircraft automatic braking pressure in the line at 43 generated. This preset threshold allows the operator to apply moderate tractor braking to the tractor wheels without causing application of aircraft brakes. At time $T_1$, when operator tractor braking pressure in the line at 26 exceeds the aforementioned threshold 23, a tractor braking signal on the line at 21 is provided by tractor braking detector means 24 of FIG. 1. Presence of an ON tractor braking signal on the line at 21 occurring at time $T_1$, causes tow brake controller 30 and pressure control valve 42 to provide aircraft automatic braking pressure in the line at 43 to increase as shown in FIG. 3. Subsequent to time $T_1$, aircraft automatic braking pressure 43 increases at a preset rate to a maximum level limit under control of aircraft brake pressure control circuit 64. At time $T_2$, tractor braking pressure in the line at 26 applied by the operator has dropped below preset threshold 23 and tractor braking signal on the line at 21 from tractor braking detector 24 is removed indicating an OFF condition. This OFF tractor braking signal on the line at 21 at time $T_2$ causes aircraft brake pressure control circuit 64 to ramp off aircraft automatic braking pressure in the line at 43 at a preset rate.

From the preceding, it can be seen that, when armed, the system operates to smoothly apply braking equally to both sides of the aircraft upon the application of tractor braking effort beyond a preset threshold level also not allowing aircraft braking to exceed a level preset by the controller 30, and to smoothly remove aircraft braking when tractor braking effort is reduced below a preset threshold level. In this connection, it should further be noted that the pressure level at which tractor braking detector 24 senses tractor braking can be preset so that only abnormally hard tractor braking will cause supplementary aircraft braking and thus normal tractor braking (as seen from FIG. 3 in the period before $T_1$) will not cause supplemental aircraft braking through the aircraft braking system. It should also be noted that the aircraft operator can override the aircraft towing braking system at any time through shuttle valves 52 and 54 by application of manual braking. Also, the aircraft operator can at any time remove the aircraft towing braking system by opening his arming switch 12 in the cockpit. Outside status light 16 and cockpit status light 14 respectively provide the towing vehicle operator and aircraft operator with monitoring to determine whether or not the system is operable.

We claim:

1. In combination in an aircraft having brakes on one side and the other side of the aircraft:
   an aircraft automatic braking system comprising in combination;
   means for generating an aircraft brake pressure control signal;
   automatic braking pressure modulating valve means responsive to said brake pressure control signal for metering automatic braking pressure to first shuttle valve means for application to said brakes on one side of said aircraft and second shuttle valve means for application to said brakes on the other side of said aircraft;
   first manually controlled pressure metering valve means coupled to said first shuttle valve means and second manually controlled pressure metering valve means coupled to said second shuttle valve means, each of said first and second shuttle valve means arranged for transmitting the greater of manually OR automatically controlled pressures for application to the brakes on the respective sides of the aircraft;
   a tractor braking system for providing tractor braking pressure for application to the brakes of the tractor;
   means for detecting tractor braking pressure;
   said means coupled to said means for generating an aircraft brake pressure control signal; and,
   wherein said means for generating an aircraft brake pressure control signal comprises aircraft brake pressure control circuit means for increasing brake pressure at a preset rate in response to detection of tractor braking pressure above a predetermined threshold level and decreasing brake pressure at a preset rate in response to detection of tractor braking pressure below a predetermined threshold level.

* * * * *